US012744601B2

(12) United States Patent
Gui et al.

(10) Patent No.: US 12,744,601 B2
(45) Date of Patent: Sep. 22, 2026

(54) OPTICAL SIGNAL SENDING APPARATUS

(71) Applicant: HUAWEI TECHNOLOGIES CO., LTD., Shenzhen (CN)

(72) Inventors: Chengcheng Gui, Wuhan (CN); Cheng Zeng, Shenzhen (CN); Jinsong Xia, Shenzhen (CN); Xiaolu Song, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 352 days.

(21) Appl. No.: 18/611,687

(22) Filed: Mar. 20, 2024

(65) Prior Publication Data

US 2024/0235689 A1 Jul. 11, 2024

Related U.S. Application Data

(63) Continuation of application No. PCT/CN2022/119311, filed on Sep. 16, 2022.

(30) Foreign Application Priority Data

Sep. 22, 2021 (CN) .......................... 202111107654.0
Dec. 17, 2021 (CN) .......................... 202111554888.X

(51) Int. Cl.
*H04B 10/50* (2013.01)

(52) U.S. Cl.
CPC ... *H04B 10/5051* (2013.01); *H04B 10/50597* (2013.01)

(58) Field of Classification Search
None
See application file for complete search history.

(56) References Cited

U.S. PATENT DOCUMENTS 5,101,450 A * 3/1992 Olshansky .......... H04J 14/0298 385/40
6,118,566 A * 9/2000 Price .................. H04J 14/0298 398/1

(Continued)

FOREIGN PATENT DOCUMENTS

CN 110441928 A 11/2019
CN 110609399 A 12/2019
CN 113359367 A 9/2021

OTHER PUBLICATIONS

Mingbo He,et al, “High performance hybrid silicon and lithium niobate mach zehnder modulators for 100 Gbit/s and beyond”, https://arxiv.org/pdf/1807.10362,2018,total 21 pages.

(Continued)

*Primary Examiner* — Darren E Wolf

(57) ABSTRACT

An optical signal sending apparatus includes an optical modulator, a differential driver, and a phase modulator. The optical modulator includes an optical input end, a first modulation region, a connection region, a second modulation region, and an optical output end. The first modulation region includes a first modulation arm and a second modulation arm. The second modulation region includes a third modulation arm and a fourth modulation arm. Each modulation arm includes an optical waveguide and electrodes on two sides of the optical waveguide. A differential drive signal is used to drive the two modulation regions, so that photoelectric signal modulation is implemented. The modulation arms are arranged in a stacked manner, so that a size of the optical modulator can be greatly reduced, thereby facilitating miniaturization.

20 Claims, 7 Drawing Sheets

(56) References Cited

U.S. PATENT DOCUMENTS

| | | | | |
|---|---|---|---|---|
| 2009/0074425 | A1* | 3/2009 | Tanaka | H04B 10/548<br>398/185 |
| 2013/0163913 | A1* | 6/2013 | Prosyk | G02F 1/035<br>385/3 |
| 2021/0124234 | A1* | 4/2021 | Vitic | G02F 1/025 |
| 2021/0278597 | A1* | 9/2021 | Sugiyama | G02F 1/212 |

OTHER PUBLICATIONS

Frédéric Boeuf,et al, "Silicon Photonics RandD and Manufacturing on 300-mm Wafer Platform", Journal of Lightwave Technology, vol. 34, No. 2, Jan. 15, 2016,XP011599000,total 10 pages.

Cheng Wang,et al, "Integrated lithium niobate electro-optic modulators operating at CMOS-compatible voltages",2018 Springer Nature Limited,total 12 pages.

* cited by examiner

OPTICAL SIGNAL SENDING APPARATUS

CROSS-REFERENCE TO RELATED APPLICATIONS

This filing is a continuation of International Application No. PCT/CN2022/119311 filed on Sep. 16, 2022, which claims priority to Chinese Patent Application No. 202111554888.X filed on Dec. 17, 2021, and Chinese Patent Application No. 202111107654.0 filed on Sep. 22, 2021. All of the aforementioned patent applications are hereby incorporated by reference in their entireties.

TECHNICAL FIELD

Disclosed embodiments relate to the field of optical communication, and in particular, to an optical signal sending apparatus.

BACKGROUND

In the field of optical communication technologies, a high-speed optical transmit end is a core part of constructing a high-speed optical network and is responsible for completing modulation from an electrical signal to an optical signal in the entire optical network. Therefore, a rate and power consumption of the optical transmit end directly determine a transmission capacity and quality of the entire high-speed optical communication field.

Currently, in a short-distance optical interconnection scenario, silicon optical modulators are widely used in optical modules of 100 G or lower due to features such as low costs and small sizes. However, due to a limitation on a free carrier migration rate, an upper theoretical bandwidth limit of the silicon optical modulator is approximately 70 GHz, and therefore the silicon optical modulator cannot meet a higher bandwidth requirement of a device in optical communication. In a long-distance large-capacity optical communication system, a coherent communication technology is widely used. Currently, a high-speed device most commonly used in a coherent system is a lithium niobate material device. Although a lithium niobate material modulator can implement a high bandwidth, because the lithium niobate material device is large in size, it is difficult to implement low costs and low power consumption under a low drive voltage and a small size.

SUMMARY

Disclosed embodiments provide an optical signal sending apparatus to implement low-cost and low-power-consumption photoelectric signal modulation.

According to a first aspect, an embodiment provides an optical signal sending apparatus, including an optical modulator, a differential driver, and a phase modulator. The optical modulator includes an optical input end, a first modulation region, a connection region, a second modulation region, and an optical output end. The first modulation region includes a first modulation arm and a second modulation arm. The second modulation region includes a third modulation arm and a fourth modulation arm. Each modulation arm includes an optical waveguide and electrodes on two sides of the optical waveguide. The optical input end is configured to split input continuous light into two paths, and respectively output the two paths to an optical waveguide of the first modulation arm of the first modulation region and an optical waveguide of the second modulation arm of the first modulation region. The first modulation arm and the second modulation arm of the first modulation region are configured to separately form an electric field between electrodes on two sides of the optical waveguide and modulate an optical signal in the optical waveguide. The connection region is configured to connect the first modulation region and the second modulation region, and respectively input an optical signal in the first modulation arm and an optical signal in the second modulation arm to the third modulation arm and the fourth modulation arm. The third modulation arm and the fourth modulation arm of the second modulation region are configured to separately form an electric field between electrodes on two sides of an optical waveguide and modulate an optical signal in the optical waveguide. The optical output end is configured to combine and output optical signals obtained through modulation in the third modulation arm and the fourth modulation arm. The electrodes include a signal electrode and a ground electrode and are respectively disposed on the two sides of the optical waveguide and configured to form an electric field to modulate light in the optical waveguide. The signal electrodes include a positive signal electrode and a negative signal electrode. The differential driver includes a positive signal output end and a negative signal output end and is configured to generate a differential drive signal. The differential drive signal is separately output to the signal electrode of the first modulation region and the signal electrode of the second modulation region. The phase modulator is configured to adjust a phase difference between a signal in the first modulation region and a signal in the second modulation region. The differential drive signal is used to drive the two modulation regions, so that photoelectric signal modulation is implemented, an amplitude voltage of differential drive is effectively used, modulation efficiency is improved, and power consumption is reduced.

In a possible design, the connection region includes two U-shaped connection waveguides, configured to connect the waveguide of the first modulation arm and a waveguide of the third modulation arm and connect the waveguide of the second modulation arm and a waveguide of the fourth modulation arm. The optical waveguides and the electrodes in the optical modulator are arranged in a stacked manner. A phase difference generated by the phase modulator is $2\pi$. The modulation arms are arranged in a stacked manner, so that a size of the optical modulator can be greatly reduced. This facilitates miniaturization of a component and a device.

In another possible design, the connection region includes two U-shaped connection waveguides, two straight waveguides, and two U-shaped connection waveguides that are sequentially connected. The connection region is configured to connect the waveguide of the first modulation arm and a waveguide of the third modulation arm and connect the waveguide of the second modulation arm and a waveguide of the fourth modulation arm. The optical waveguides and the electrodes in the optical modulator are arranged in a stacked manner. A phase difference generated by the phase modulator is $\pi$. The modulation arms are arranged in a stacked manner, so that a size of the optical modulator can be greatly reduced. This facilitates miniaturization of a component and a device. In addition, flexibility of an interface on different sides of the apparatus is provided.

In another possible design, a material of the optical waveguide is a material having Pockels effect. The material of the optical waveguide includes a lithium niobate thin film, an organic polymer, a lithium tantalate thin film, barium borate, or a gallium arsenide material. Various materials provide manufacturing flexibility.

In another possible design, the first modulation arm and the second modulation arm share one positive signal electrode, or the third modulation arm and the fourth modulation arm share one negative signal electrode. This reduces a device size.

In another possible design, the phase modulator is an electrical delay line. The differential driver outputs the differential drive signal to the positive signal electrode or the negative signal electrode through at least one electrical delay line. The electrical delay line is an adjustable electrical delay line. The delay line is used to provide modulation flexibility.

In another possible design, the phase modulator is a heater and is located in the connection region. A material of the heater includes nickel-titanium or metal. The heater is used to adjust a phase. This improves flexibility of the device.

According to a second aspect, an embodiment provides an optical module, including the foregoing optical signal sending apparatus and an optical signal receiving apparatus. The optical signal receiving apparatus is configured to receive an optical signal.

According to a third aspect, an embodiment provides an optical communication device, including a laser and an optical signal sending apparatus. The laser is configured to output continuous light.

According to the foregoing solutions provided in embodiments, the differential drive signal is used to drive the two modulation regions, so that photoelectric signal modulation is implemented, a drive voltage is greatly decreased, modulation efficiency is improved, and device power consumption is reduced.

DESCRIPTION OF EMBODIMENTS

To make objectives, technical solutions, and advantages of the present disclosure more clear, the following further describes implementations of the present disclosure in detail with reference to accompanying drawings.

Figure 1:
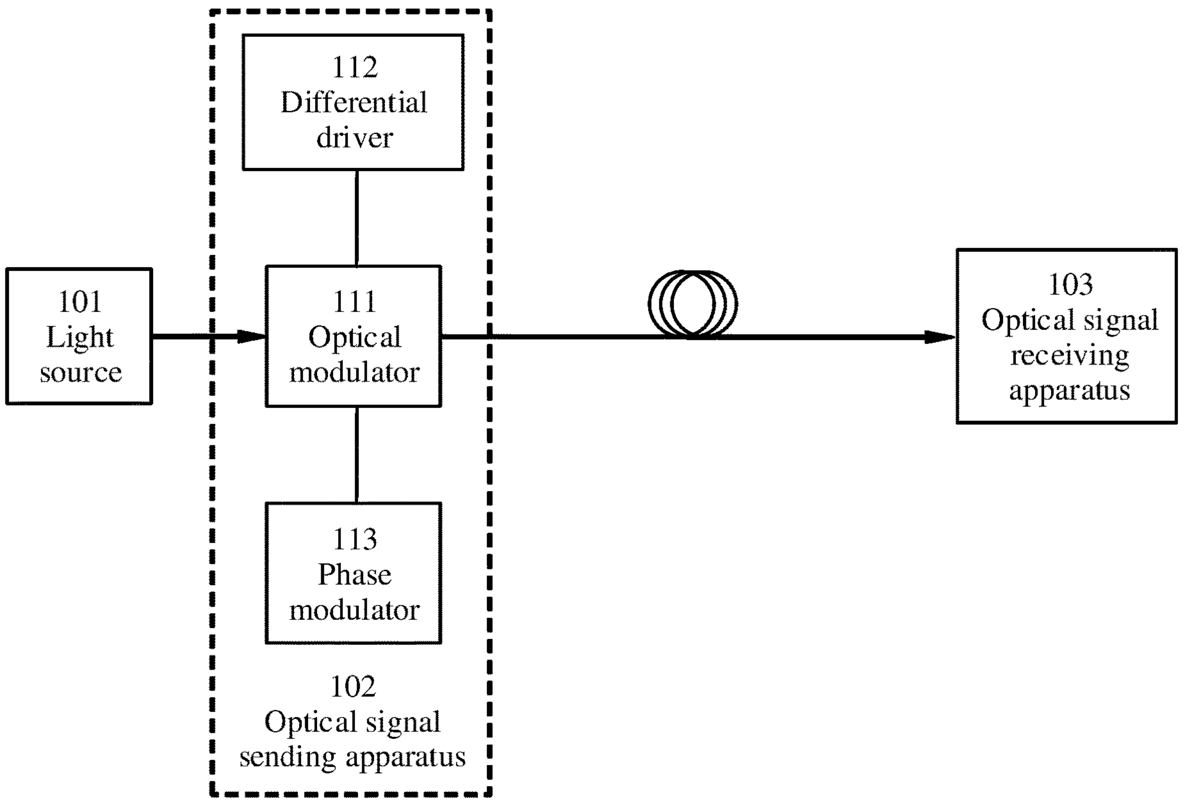
FIG. 1 is a schematic diagram of a structure of an optical communication system according to an embodiment of the present disclosure.

As shown in FIG. 1, an embodiment provides an optical signal sending apparatus 102. In an optical transmission system, a transmit end includes a light source 101 and the optical signal sending apparatus 102. The optical signal sending apparatus 102 includes an optical modulator 111, a differential driver 112, and a phase modulator 113. The differential driver 112 is configured to output a differential drive signal to the optical modulator 111 based on a to-be-transmitted electrical signal. The optical modulator 111 is configured to modulate continuous light output by the light source 101 into signal light based on the differential drive signal. The phase modulator 113 is configured to adjust a phase difference between signals. In this way, the electrical signal to-be-transmitted is modulated into an optical signal. The optical signal obtained through modulation is transmitted to a receive end through an optical fiber and is received and processed by an optical signal receiving apparatus 103.

The light source 101 and the optical signal sending apparatus 102 may be located in a same physical device, for example, an optical communication device. A laser outputs the continuous light. The optical signal sending apparatus modulates the continuous light into the signal light and outputs the signal light to the receive end.

In addition, in the optical communication device, an optical module on an interface includes the foregoing optical signal sending apparatus and the foregoing optical signal receiving apparatus to implement a bidirectional receiving and sending function.

Figure 2:
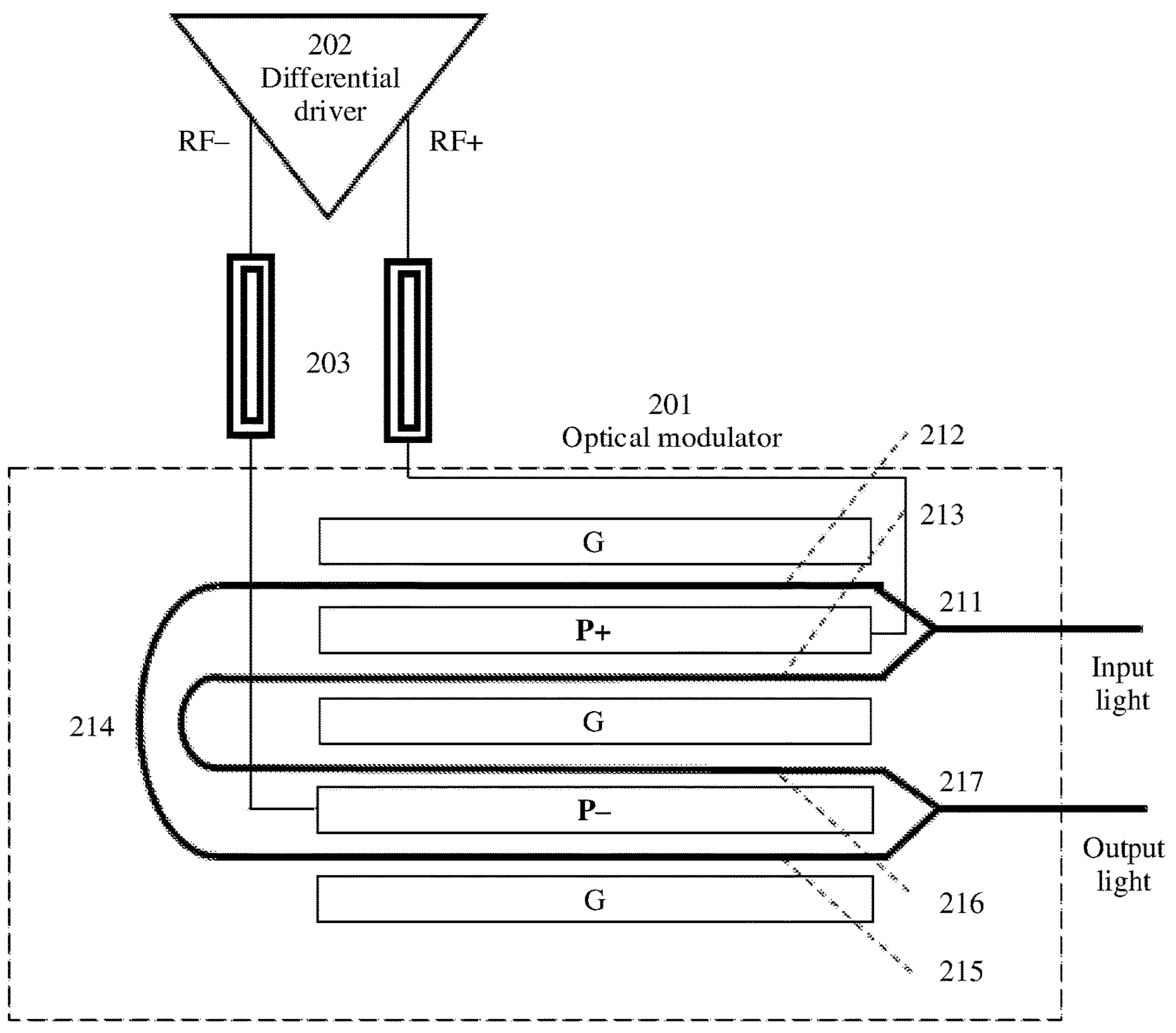
FIG. 2 is a schematic diagram of a structure of an optical signal sending apparatus according to an embodiment of the present disclosure.

FIG. 2 is a schematic diagram of a structure of an optical signal sending apparatus according to an embodiment of the present disclosure. The optical signal sending apparatus includes an optical modulator 201, a differential driver 202, and a phase modulator 203. The optical modulator 201 includes an optical input end 211, a first modulation region including a first modulation arm 212 and a second modulation arm 213, a connection region 214, a second modulation region including a third modulation arm 215 and a fourth modulation arm 216, and an optical output end 217. Each modulation arm includes an optical waveguide and electrodes on two sides of the optical waveguide.

The optical input end 211 is configured to split input light (such as continuous light) into two paths, and respectively output the two paths to an optical waveguide of the first modulation arm of the first modulation region and an optical waveguide of the second modulation arm of the first modulation region.

The first modulation arm 212 and the second modulation arm 213 of the first modulation region are configured to separately form an electric field between electrodes on two sides of the each of the optical waveguides associated with the first and second modulation arms and to modulate an optical signal in each of the optical waveguides.

The connection region 214 is configured to connect the first modulation region and the second modulation region, and respectively input an optical signal from the first modulation arm and an optical signal from the second modulation arm to the third modulation arm and the fourth modulation arm. The connection region in FIG. 2 includes two U-shaped waveguides that separately connect the first and second modulation arms of the first modulation region to the third and fourth modulation arms of the second modulation region.

The third modulation arm 215 and the fourth modulation arm 216 of the second modulation region are configured to separately form an electric field between electrodes on two sides of an optical waveguide and modulate an optical signal in the optical waveguide.

The optical output end 217 is configured to combine and output optical signals obtained through modulation in the third modulation arm and the fourth modulation arm.

The electrodes on the two sides of the optical waveguide in each modulation arm include a signal electrode P and a ground electrode G and are respectively disposed on the two sides of the optical waveguide and configured to form an electric field to modulate continuous light in the optical waveguide. The signal electrodes include a positive signal electrode "P+" and a negative signal electrode "P−".

The differential driver 202 is configured to generate a differential drive signal and includes a positive signal output end "RF+" and a negative signal output end "RF−". The differential drive signal is separately output to the positive signal electrode of the first modulation region and the negative signal electrode of the second modulation region.

The phase modulator 203 is configured to adjust a phase difference between an optical signal in the first modulation region and an optical signal in the second modulation region. The phase modulator in FIG. 2 is in the form of two electrical delay lines. The differential drive signal output by the differential driver is connected to the positive signal electrode and the negative signal electrode of the two modulation regions through the two electrical delay lines. The phase difference between the two delay lines is 2π so that two paths of signals at RF+ and RF− still retain an original phase π. Further, at least one of the two delay lines is adjustable, and the adjustable delay line may be adjusted within a range from 0 to 2π to flexibly adjust the phase difference between the two paths of signals.

In FIG. 2, the optical input end and the optical output end are located on a same side of the apparatus. The optical waveguides and the electrodes of the four modulation arms are arranged in a stacked manner. A material of the optical waveguide is a material having Pockels effect, including a lithium niobate thin film, an organic polymer, a lithium tantalate thin film, barium borate, or a gallium arsenide material.

In the embodiment shown in FIG. 2, the differential drive signal is used to drive the two modulation regions so that photoelectric signal modulation is implemented. The modulation arms are arranged in a stacked manner so that a size of the optical modulator can be greatly reduced. This facilitates miniaturization of a component and a device. In this differential manner, an amplitude voltage of differential drive is effectively used, modulation efficiency is improved, and power consumption is reduced.

In some application scenarios, input light and output light of the optical modulator need to be distributed on two sides of the apparatus. In the embodiment shown in FIG. 3, input light and output light are respectively on a left side and a right side of the apparatus. The optical signal sending apparatus includes an optical modulator 301, a differential driver 302, and a phase modulator 303. The optical modulator 301 includes an optical input end 311, a first modulation region including a first modulation arm 312 and a second modulation arm 313, a connection region 314, a second modulation region including a third modulation arm 315 and a fourth modulation arm 316, and an optical output end 317.

Figure 3:
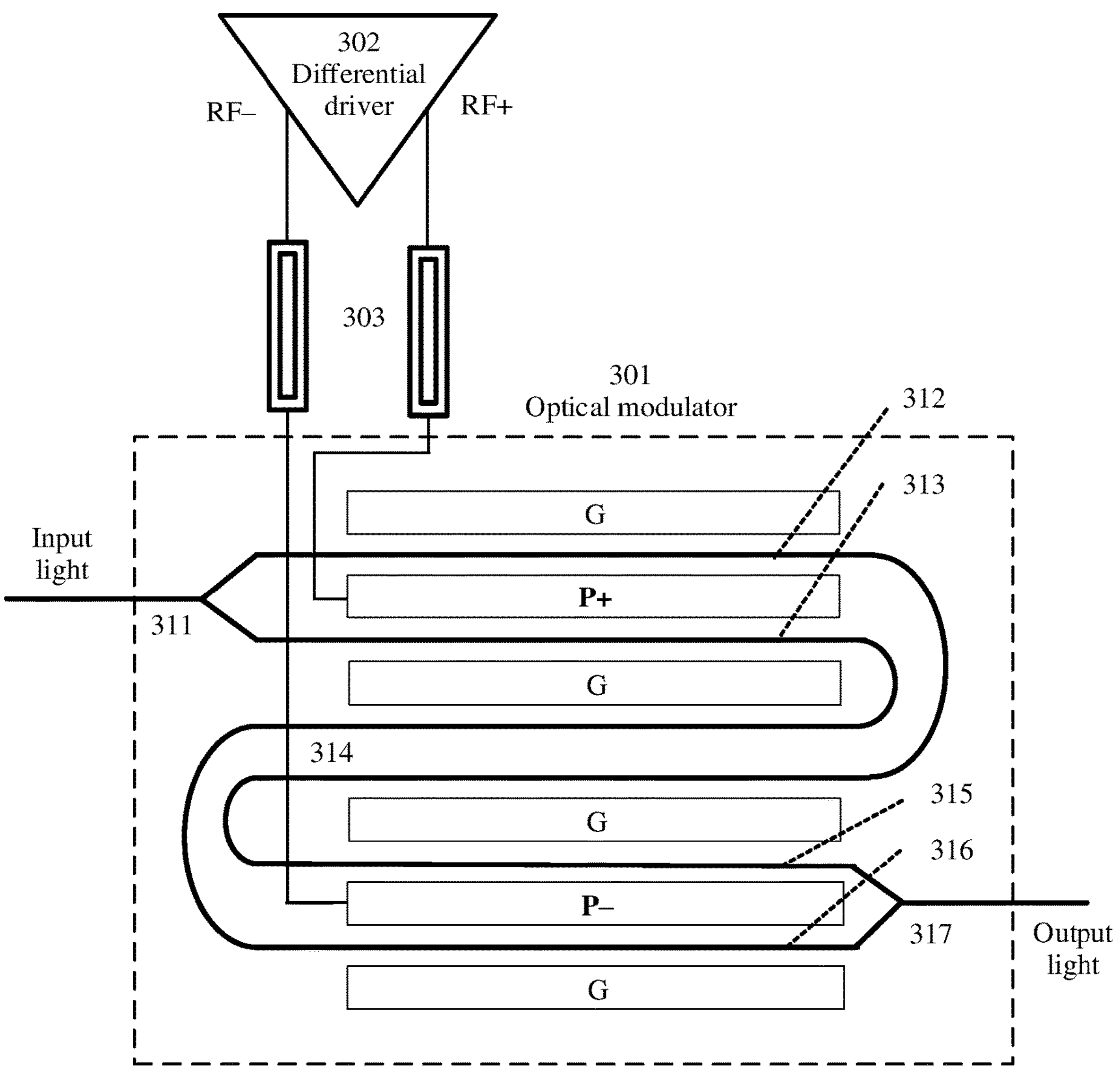
FIG. 3 is a schematic diagram of a structure of another optical signal sending apparatus according to an embodiment of the present disclosure.

In FIG. 3, the connection region 314 includes U-shaped bent waveguides on two sides and a pair of straight waveguides in the middle and is configured to connect the two modulation regions. The phase modulator 303 is two electrical delay lines connected to outputs of the differential driver, and a phase difference is π. Functions of other parts are the same as functions of corresponding parts in FIG. 2. Details are not described again.

In FIG. 3, the optical input end and the optical output end are located on different sides of the apparatus. The optical waveguides and the electrodes of the four modulation arms and some waveguides of the connection region 314 are arranged in a stacked manner. Similarly, a material of the optical waveguide may be a material having linear photoelectric effect, including a lithium niobate thin film, an organic polymer, or a lithium tantalate thin film. In this manner of implementation, flexibility of a device is improved so that a size of the optical modulator can be greatly reduced. This facilitates miniaturization of a component and the device.

Figure 4:
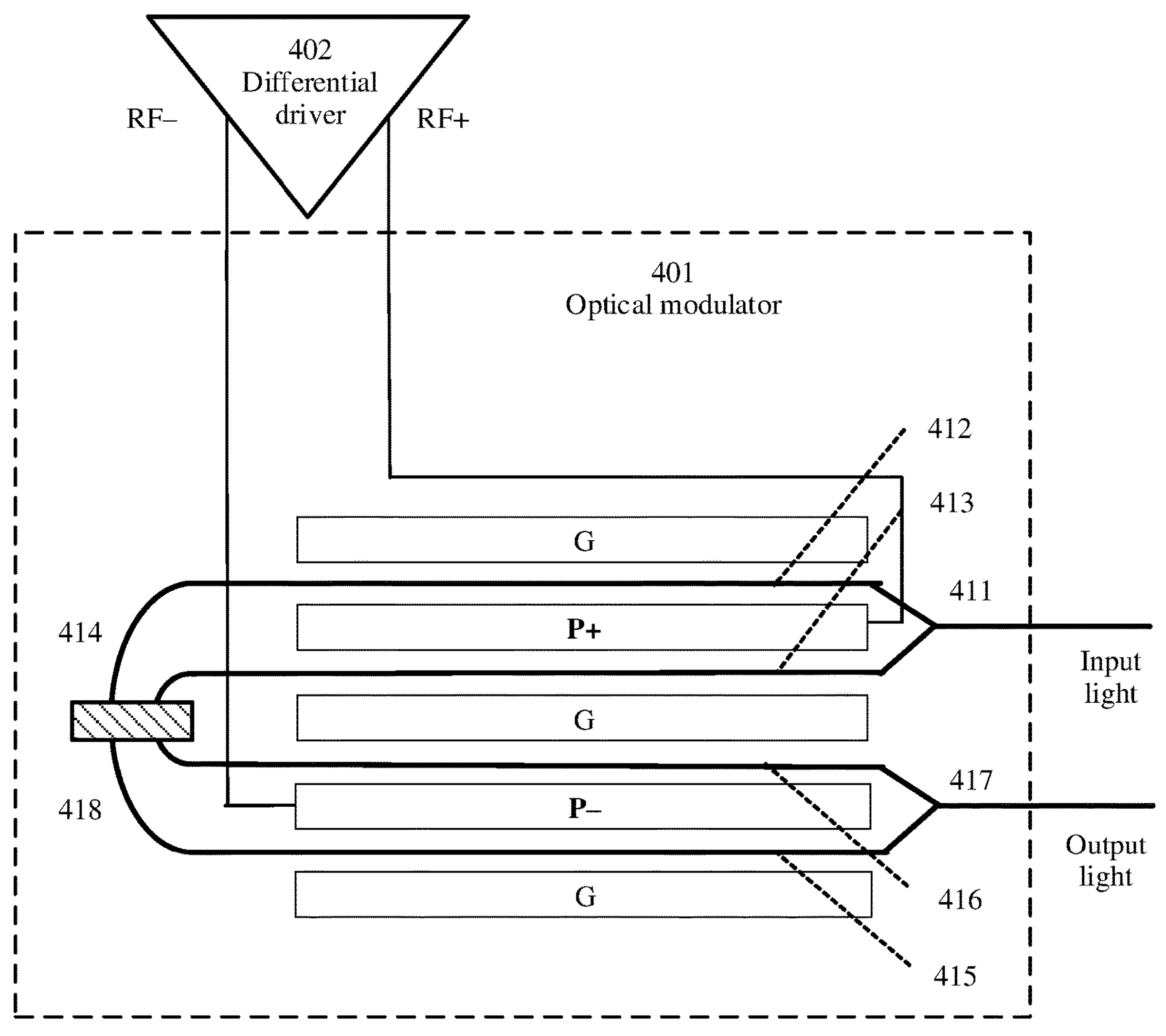
FIG. 4 is a schematic diagram of a structure of another optical signal sending apparatus according to an embodiment of the present disclosure.
Figure 5:
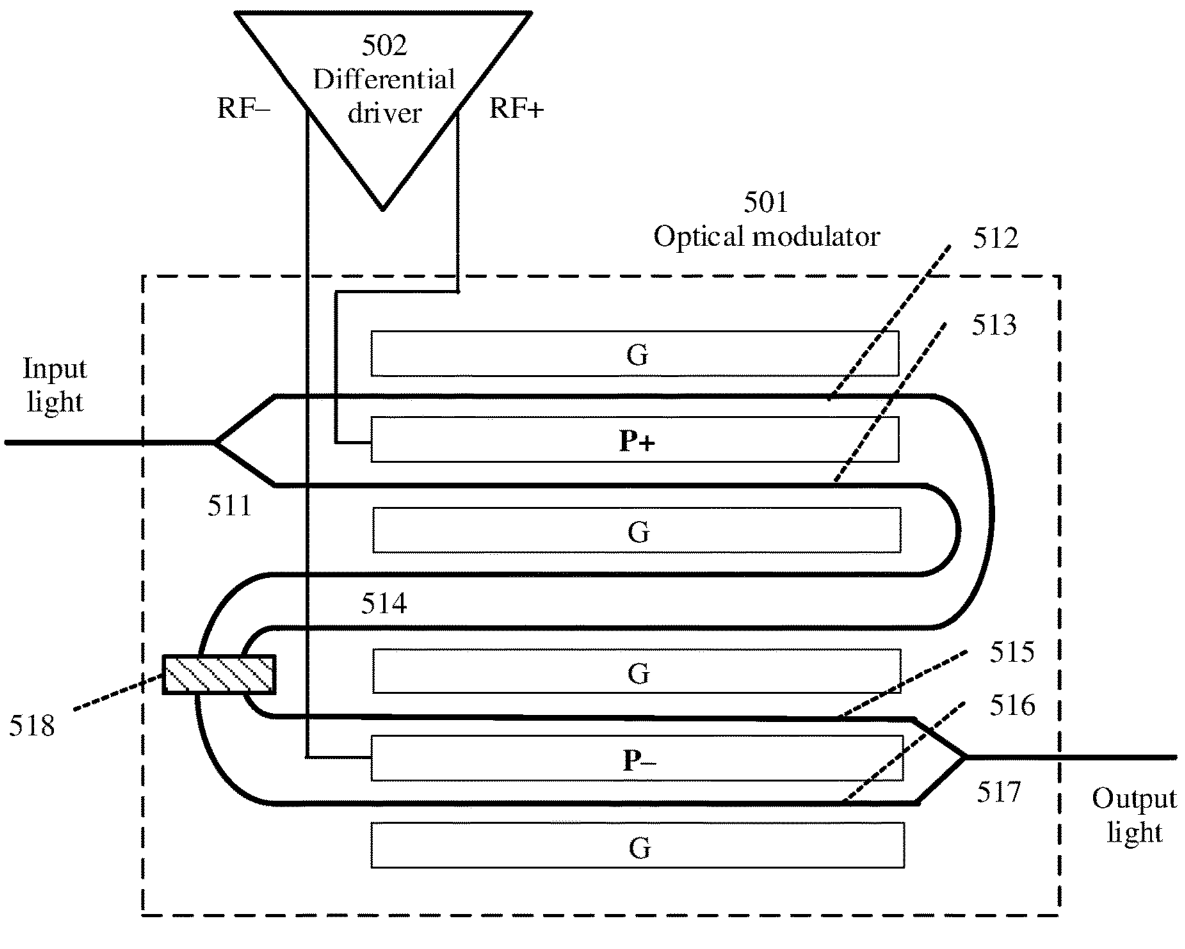
FIG. 5 is a schematic diagram of a structure of another optical signal sending apparatus according to an embodiment of the present disclosure.

Alternatively, the phase modulator 113 may be a heater. As shown in FIG. 4 and FIG. 5, a phase modulator 418 or 518 does not use an electrical delay line, but uses a heater, and is located in a connection region 414 or 514 and connected to two waveguides of the connection region. An adjustment range of the heater is at least 2π. Different phase modulators improve flexibility of the device. Other components in FIG. 4 are respectively the same as components in FIG. 2 that have a same location/function. Other components in FIG. 5 are respectively the same as components in FIG. 3 that have a same location/function. For example, an optical signal sending apparatus in FIG. 4 includes an optical modulator 401, a differential driver 402, and a phase modulator 403. The optical modulator 401, the differential driver 402, and the phase modulator 403 are respectively consistent with the optical modulator 201, the differential driver 202, and the phase modulator 203 in FIG. 2. For details of other components, refer to the related descriptions in FIG. 2. Details are not described herein again.

Figure 6:
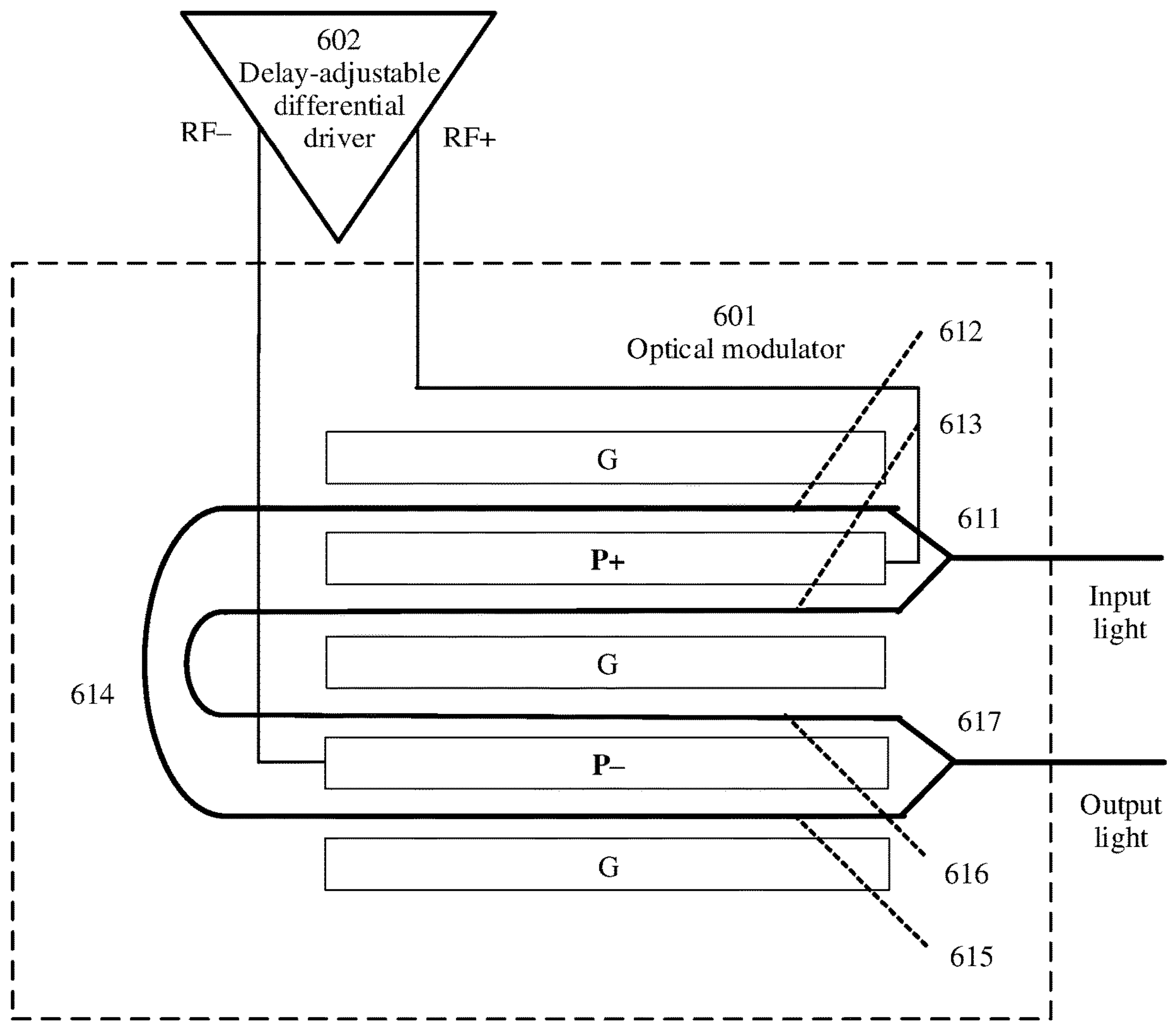
FIG. 6 is a schematic diagram of a structure of another optical signal sending apparatus according to an embodiment of the present disclosure.

FIG. 6 is a schematic diagram of a structure of another optical signal sending apparatus according to an embodiment of the present disclosure. That is, delay is adjustable in a differential driver. A differential driver 602 is configured to generate a differential drive signal and also functions as a phase modulator to adjust a phase difference between a signal in a first modulation region and a signal in a second modulation region. The differential driver may be connected to two signal input ports of a modulator through cables or metal electrodes. Functions of other parts are the same as functions of corresponding parts in FIG. 2. Details are not described again.

In the embodiment shown in FIG. 6, a phase modulation function of the differential driver 602 is used to adjust a phase difference between two paths of signals at a positive signal output end "RF+" and a negative signal output end "RF−" to still retain an original phase 2π, so that an electrical drive signal is completely loaded to the modulator, and a drive amplitude is maximized. This improves a signal amplitude.

Figure 7:
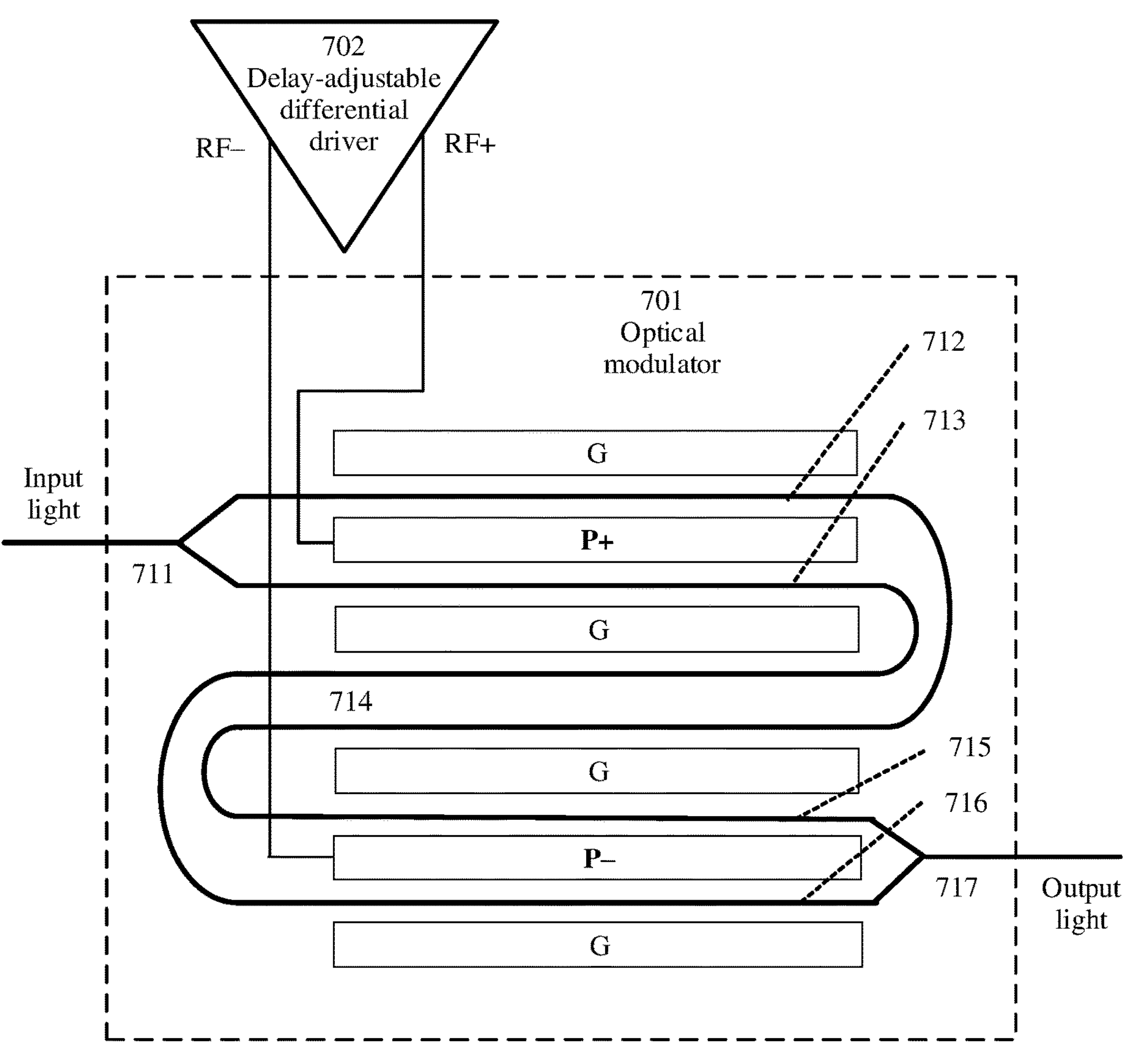
FIG. 7 is a schematic diagram of a structure of another optical signal sending apparatus according to an embodiment of the present disclosure.

FIG. 7 is a schematic diagram of a structure of another optical signal sending apparatus according to an embodiment of the present disclosure. That is, delay is adjustable in a differential driver. A differential driver 702 is configured to generate a differential drive signal, and also functions as a phase modulator to adjust a phase difference between a signal in a first modulation region and a signal in a second modulation region. The differential driver may be connected to two signal input ports of a modulator through cables or metal electrodes. Functions of other parts are the same as functions of corresponding parts in FIG. 3. Details are not described again.

In the embodiment shown in FIG. 7, a phase modulation function of the differential driver 702 is used to adjust a phase difference between two paths of signals at a positive signal output end "RF+" and a negative signal output end "RF−" to a phase 2π, so that an electrical drive signal is completely loaded to the modulator, and a drive amplitude is maximized. This improves a signal amplitude.

Although the foregoing description is provided with reference to embodiments, a person skilled in the art may understand and implement other variations of the disclosed embodiments by viewing the accompanying drawings, disclosed content, and the appended claims. In the claims, "comprising" does not exclude another component or another step, and "a" or "one" does not exclude a case of multiples of what is being referenced.

While embodiments are described with reference to specific features, various modifications and combinations may be made thereto. Correspondingly, the specification and the accompanying drawings are merely examples of embodiments as defined by the appended claims, and are considered as any of or all modifications, variations, combinations or equivalents that cover the scope of the subject matter sought to be protected. It is clear that a person skilled in the art can make various modifications and variations to the present invention without departing from the scope of the present invention. The foregoing disclosure is intended to cover these modifications and variations provided that they fall within the scope of protection defined by the following claims and their equivalent technologies.

What is claimed is:

1. An optical signal sending apparatus, comprising:
an optical modulator;
a differential driver; and
a phase modulator, wherein:
the optical modulator comprises:
an optical input end;
a first modulation region;
a connection region;
a second modulation region; and
an optical output end, wherein:
the first modulation region comprises a first modulation arm including a first optical waveguide and a second modulation arm including a second optical waveguide, and the second modulation region comprises a third modulation arm including a third optical waveguide and a fourth modulation arm including a fourth optical waveguide, electrodes being provided on two sides of each of the optical waveguides;
the optical input end is configured to split input light into two paths and respectively output the two paths to the first and second optical waveguides of the first modulation region, the first modulation arm and the second modulation arm being configured to separately form an electric field between electrodes on two sides of each of the first and second optical waveguides and to modulate an optical signal in each of the first and second optical waveguides;
the connection region is configured to connect the first modulation region and the second modulation region and to respectively input the optical signal from the first modulation arm and the optical signal from the second modulation arm to the third modulation arm and to the fourth modulation arm;
the third modulation arm and the fourth modulation arm of the second modulation region are configured to separately form an electric field between electrodes on two sides of the third and fourth optical waveguides and to modulate an optical signal in each of the third and fourth optical waveguides;
the optical output end is configured to combine and to output optical signals obtained through modulation in the third modulation arm and the fourth modulation arm;
each electrode pair comprises a signal electrode and a ground electrode, the electrodes of each electrode pair being respectively disposed on the two sides of an associated optical waveguide and configured to form an electric field to modulate light in each of the optical waveguides, the signal electrodes comprising a positive signal electrode and a negative signal electrode;
the differential driver comprises a positive signal output end and a negative signal output end and is configured to generate and separately output a differential drive signal to the signal electrode of the first modulation region and to the signal electrode of the second modulation region; and
the phase modulator is configured to adjust a phase difference between the signals in the first modulation region and the signals in the second modulation region.

2. The optical signal sending apparatus according to claim 1, wherein the connection region comprises a first U-shaped connection waveguide configured to connect the first waveguide to the third waveguide, and a second U-shaped connection waveguide configured to connect the second waveguide to the fourth waveguide.

3. The optical signal sending apparatus according to claim 2, wherein the optical waveguides and the electrodes in the optical modulator are arranged in a stacked manner, and a phase difference generated by the phase modulator is $2\pi$.

4. The optical signal sending apparatus according to claim 1, wherein the connection region comprises two U-shaped connection waveguides, two straight waveguides, and two U-shaped connection waveguides that are sequentially connected, and the connection region is configured to connect the first waveguide with the third waveguide and to connect the second waveguide with the fourth.

5. The optical signal sending apparatus according to claim 4, wherein the optical waveguides and the electrodes in the optical modulator are arranged in a stacked manner, and a phase difference generated by the phase modulator is $\pi$.

6. The optical signal sending apparatus according to claim 1, wherein at least one of the optical waveguides comprises a material having Pockels effect.

7. The optical signal sending apparatus according to claim 1, wherein at least one of the optical waveguides comprises one of a lithium niobate thin film, an organic polymer, a lithium tantalate thin film, barium borate, or a gallium arsenide material.

8. The optical signal sending apparatus according to claim 1, wherein the first modulation arm and the second modulation arm share one positive signal electrode, or the third modulation arm and the fourth modulation arm share one negative signal electrode.

9. The optical signal sending apparatus according to claim 1, wherein the phase modulator is an electrical delay line, and the differential driver outputs the differential drive signal to the positive signal electrode or the negative signal electrode through at least one electrical delay line.

10. The optical signal sending apparatus according to claim 9, wherein the electrical delay line is an adjustable electrical delay line.

11. The optical signal sending apparatus according to claim 1, wherein the phase modulator is a heater located in the connection region.

12. The optical signal sending apparatus according to claim 11, wherein the heater comprises nickel-titanium or metal.

13. An optical module, comprising:

an optical signal sending apparatus including an optical modulator, a differential driver, and a phase modulator; and an optical signal receiving apparatus configured to receive an optical signal, wherein the optical modulator comprises:

an optical input end;

a first modulation region;

a connection region;

a second modulation region; and an optical output end, wherein;

the first modulation region comprises a first modulation arm including a first optical waveguide and a second modulation arm including a second optical waveguide, and the second modulation region comprises a third modulation arm including a third optical waveguide and a fourth modulation arm including a fourth optical waveguide, electrodes being provided on two sides of each of the optical waveguides;

the optical input end is configured to split input light into two paths and respectively output the two paths to the first and second optical waveguides of the first modulation region, the first modulation arm and the second modulation arm being configured to separately form an electric field between electrodes on two sides of each of the first and second optical waveguides and to modulate an optical signal in each of the first and second optical waveguides;

the connection region is configured to connect the first modulation region and the second modulation region and to respectively input the optical signal from the first modulation arm and the optical signal from the second modulation arm to the third modulation arm and to the fourth modulation arm;

the third modulation arm and the fourth modulation arm of the second modulation region are configured to separately form an electric field between electrodes on two sides of the third and fourth optical waveguides and to modulate an optical signal in each of the third and fourth optical waveguides;

the optical output end is configured to combine and to output optical signals obtained through modulation in the third modulation arm and the fourth modulation arm;

each electrode pair comprises a signal electrode and a ground electrode, the electrodes of each electrode pair being respectively disposed on the two sides of an associated optical waveguide and configured to form an electric field to modulate light in each of the optical waveguides, the signal electrodes comprising a positive signal electrode and a negative signal electrode;

the differential driver comprises a positive signal output end and a negative signal output end and is configured to generate and separately output a differential drive signal to the signal electrode of the first modulation region and to the signal electrode of the second modulation region; and the phase modulator is configured to adjust a phase difference between the signals in the first modulation region and the signals in the second modulation region.

14. The optical module according to claim 13, wherein the connection region comprises a first U-shaped connection waveguide configured to connect the first waveguide to the third waveguide, and a second U-shaped connection waveguide configured to connect the second waveguide to the fourth waveguide.

15. The optical module according to claim 14, wherein the optical waveguides and the electrodes in the optical modulator are arranged in a stacked manner, and a phase difference generated by the phase modulator is 2π.

16. The optical module according to claim 13, wherein the connection region comprises two U-shaped connection waveguides, two straight waveguides, and two U-shaped connection waveguides that are sequentially connected, the connection region is configured to connect the first waveguide with the third waveguide and to connect the second waveguide with the fourth waveguide.

17. The optical module according to claim 16, wherein the optical waveguides and the electrodes in the optical modulator are arranged in a stacked manner, and a phase difference generated by the phase modulator is π.

18. The optical module according to claim 13, wherein at least one of the optical waveguides comprises a material having Pockels effect.

19. The optical module according to claim 13, wherein at least one of the optical waveguides comprises one of a lithium niobate thin film, an organic polymer, a lithium tantalate thin film, barium borate, or a gallium arsenide material.

20. An optical communication device, comprising a laser and an optical signal sending apparatus, the laser being configured to output continuous light, and the optical signal sending apparatus comprises:

an optical modulator;

a differential driver; and a phase modulator, wherein:

the optical modulator comprises:

an optical input end;

a first modulation region;

a connection region;

a second modulation region; and an optical output end, wherein;

the first modulation region comprises a first modulation arm including a first optical waveguide and a second modulation arm including a second optical waveguide, and the second modulation region comprises a third modulation arm including a third optical waveguide and a fourth modulation arm including a fourth optical waveguide, electrodes being provided on two sides of each of the optical waveguides;

the optical input end is configured to split input light into two paths and respectively output the two paths to the first and second optical waveguides of the first modulation region, the first modulation arm and the second modulation arm being configured to separately form an electric field between electrodes on two sides of each of the first and second optical waveguides and to modulate an optical signal in each of the first and second optical waveguides;

the connection region is configured to connect the first modulation region and the second modulation region and to respectively input the optical signal from the first modulation arm and the optical signal from the second modulation arm to the third modulation arm and to the fourth modulation arm;

the third modulation arm and the fourth modulation arm of the second modulation region are configured to separately form an electric field between electrodes on two sides of the third and fourth optical waveguides and to modulate an optical signal in each of the third and fourth optical waveguides;

the optical output end is configured to combine and to output optical signals obtained through modulation in the third modulation arm and the fourth modulation arm;

each electrode pair comprises a signal electrode and a ground electrode, the electrodes of each electrode pair being respectively disposed on the two sides of an associated optical waveguide and configured to form an electric field to modulate light in each of the optical waveguides, the signal electrodes comprising a positive signal electrode and a negative signal electrode;

the differential driver comprises a positive signal output end and a negative signal output end and is configured to generate and separately output a differential drive signal to the signal electrode of the first modulation region and to the signal electrode of the second modulation region; and the phase modulator is configured to adjust a phase difference between the signals in the first modulation region and the signals in the second modulation region.

* * * * *